(12) United States Patent
Wernersson et al.

(10) Patent No.: US 10,574,308 B2
(45) Date of Patent: Feb. 25, 2020

(54) MANAGING OF CHANNEL STATE INFORMATION IN A MULTIPLE-ANTENNA COMMUNICATION SYSTEM

(71) Applicant: Telefonaktiebolaget LM Ericsson (publ), Stockholm (SE)

(72) Inventors: Niklas Wernersson, Kungsängen (SE); Sebastian Faxér, Järfälla (SE); Maksym Girnyk, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/474,558

(22) PCT Filed: Jan. 24, 2017

(86) PCT No.: PCT/SE2017/050063
§ 371 (c)(1),
(2) Date: Jun. 28, 2019

(87) PCT Pub. No.: WO2018/139963
PCT Pub. Date: Aug. 2, 2018

(65) Prior Publication Data
US 2019/0386715 A1    Dec. 19, 2019

(51) Int. Cl.
*H04B 7/0417* (2017.01)
*H04B 7/06* (2006.01)
*H04L 5/00* (2006.01)

(52) U.S. Cl.
CPC ......... *H04B 7/0417* (2013.01); *H04B 7/0626* (2013.01); *H04L 5/005* (2013.01); *H04L 5/0023* (2013.01); *H04L 5/0051* (2013.01)

(58) Field of Classification Search
CPC .. H04B 7/0417; H04B 7/0452; H04B 7/0626; H04L 5/0023; H04L 5/005; H04L 5/0051
See application file for complete search history.

(56) References Cited

U.S. PATENT DOCUMENTS 7,869,819 B2 * 1/2011 Noldus .................. H04Q 3/005
455/433
9,215,729 B2 * 12/2015 Ostergaard ........ H04W 72/1284
(Continued)

OTHER PUBLICATIONS

International Search Report and Written Opinion for Application No. PCT/SE2017/050063 dated Oct. 19, 2017, 15 pages.

*Primary Examiner* — James M Perez
(74) *Attorney, Agent, or Firm* — NDWE LLP

(57) ABSTRACT

A method for managing channel state information in a wireless communication system comprises obtaining a base set of channel state information of a channel between a first node and a second node based on at least one transmission signal. A dedicated reference signal, specific for a limited set of nodes comprising the second node is transmitted within a channel subspace selected in dependence of the obtained base set of channel state information. At least one common channel state information reference signal specific for an intended coverage area of the first node is transmitted. The common channel state information reference signal allows for obtaining a fall-back set of channel state information of a channel between the first node and the second node. The fall-back set of channel state information represents coarser granularity, in spatial dimensions, than the base set of channel state information.

18 Claims, 11 Drawing Sheets

(56) References Cited

U.S. PATENT DOCUMENTS

| | | | |
|---|---|---|---|
| 9,467,273 B2* | 10/2016 | Kim | H04L 5/0091 |
| 9,654,264 B2* | 5/2017 | Athley | H04L 5/0048 |
| 9,867,060 B2* | 1/2018 | Inoue | H04W 16/28 |
| 9,948,432 B2* | 4/2018 | Eriksson | H04L 1/0027 |
| 9,967,013 B2* | 5/2018 | Kang | H04B 7/0617 |
| 10,033,487 B2* | 7/2018 | Eriksson | H04L 1/1812 |
| 10,056,956 B2* | 8/2018 | Rahman | H04B 7/0469 |
| 10,080,234 B2* | 9/2018 | Ostergaard | H04W 72/0446 |
| 10,129,010 B2* | 11/2018 | Wyville | H04B 1/525 |
| 10,181,964 B2* | 1/2019 | Yum | H04L 25/0204 |
| 2011/0188422 A1* | 8/2011 | Ostergaard | H04W 72/1284 370/311 |
| 2011/0305263 A1* | 12/2011 | Jöngren | H04B 7/0617 375/219 |
| 2012/0058791 A1* | 3/2012 | Bhattad | H04L 1/0606 455/509 |
| 2013/0230081 A1* | 9/2013 | Wernersson | H04B 7/0617 375/219 |
| 2013/0272263 A1* | 10/2013 | Pi | H04W 72/042 370/330 |
| 2014/0044044 A1* | 2/2014 | Josiam | H04W 24/10 370/328 |
| 2014/0044061 A1* | 2/2014 | Yue | H04W 72/042 370/329 |
| 2014/0293948 A1* | 10/2014 | Jiang | H04J 11/0056 370/329 |
| 2015/0016291 A1* | 1/2015 | Kim | H04L 1/0026 370/252 |
| 2015/0016379 A1* | 1/2015 | Nam | H04B 7/0456 370/329 |
| 2015/0098440 A1* | 4/2015 | Yang | H04J 11/0056 370/330 |
| 2015/0124688 A1* | 5/2015 | Xu | H04B 7/0452 370/312 |
| 2015/0200755 A1* | 7/2015 | Hammarwall | H04L 5/005 370/329 |
| 2015/0236762 A1* | 8/2015 | Ko | H04B 7/046 375/260 |
| 2015/0319633 A1* | 11/2015 | Ji | H04B 7/0452 370/252 |
| 2015/0381252 A1* | 12/2015 | Kang | H04B 7/024 370/329 |
| 2016/0080051 A1* | 3/2016 | Sajadieh | H04B 7/0456 375/267 |
| 2016/0080052 A1* | 3/2016 | Li | H04B 7/0456 375/267 |
| 2016/0149680 A1* | 5/2016 | Kang | H04B 7/0417 370/329 |
| 2017/0245165 A1* | 8/2017 | Onggosanusi | H04L 5/0048 |
| 2017/0257154 A1* | 9/2017 | Wernersson | H04B 7/0469 |
| 2018/0034612 A1* | 2/2018 | Lin | H04L 5/0048 |
| 2018/0083681 A1* | 3/2018 | Faxer | H04B 7/0413 |
| 2018/0115357 A1* | 4/2018 | Park | H04B 7/04 |
| 2018/0249339 A1* | 8/2018 | Noh | H04L 5/0051 |
| 2018/0262246 A1* | 9/2018 | Faxer | H04B 7/0478 |
| 2018/0316398 A1* | 11/2018 | Wernersson | H04B 7/0469 |
| 2019/0123864 A1* | 4/2019 | Zhang | H04B 7/088 |
| 2019/0222395 A1* | 7/2019 | Larsson | H04W 72/1289 |
| 2019/0230659 A1* | 7/2019 | Sahlin | H04L 1/16 |
| 2019/0260559 A1* | 8/2019 | Wu | H04L 5/0082 |
| 2019/0341976 A1* | 11/2019 | Nam | H04B 7/0478 |
| 2019/0349777 A1* | 11/2019 | Noh | H04W 16/14 |

* cited by examiner

TIME

MANAGING OF CHANNEL STATE INFORMATION IN A MULTIPLE-ANTENNA COMMUNICATION SYSTEM

CROSS-REFERENCE TO RELATED APPLICATIONS

This application is a National stage of International Application No. PCT/SE2017/050063, filed Jan. 24, 2017, which is hereby incorporated by reference.

TECHNICAL FIELD

The proposed technology generally relates to multiple-antenna communication systems, and in particular to methods and arrangements for managing of channel state information in such a system.

BACKGROUND

Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO.

The Long-Term Evolution (LTE) standard is currently evolving with enhanced MIMO support. A core component in LTE is the support of MIMO antenna deployments and MIMO related techniques. The spatial multiplexing mode is aimed for high data rates in favorable channel conditions. For efficient performance, it is central to obtain information about the channel. This information is commonly referred to as channel state information (CSI).

In LTE Release-10, a new reference symbol sequence was introduced for the intent to estimate channel state information, the CSI Reference Symbol (CSI-RS). The CSI-RS provides several advantages over basing the CSI feedback on the Cell-specific Reference Signal (CRS) which were used, for that purpose, in previous releases. Firstly, the CSI-RS is not used for demodulation of the data signal, and thus does not require the same density, i.e. the overhead of the CSI-RS is substantially less. Secondly, CSI-RS provides a much more flexible means to configure CSI feedback measurements, e.g., which CSI-RS resource to measure on can be configured in a User Equipment (UE) specific manner. By measuring on a CSI-RS a UE can estimate the effective channel the CSI-RS is traversing including the radio propagation channel and antenna gains.

Moreover, in LTE Rel. 13, a new type of CSI-RS transmitting scheme was introduced, so called beamformed, or precoded, CSI-RS. These CSI-RSs are intended to be UE-specific instead of cell-specific, so that each UE is assigned a dedicated CSI-RS resource. Such beamformed CSI-RS typically contain much fewer ports than non-precoded CSI-RS and typically spans a narrower main beam, as they are typically only intended to cover the UE of interest and not the entire cell coverage area. An alternative way of utilizing precoded, or beamformed, CSI-RS is to transmit a sequence of beamformed CSI-RSs in order to cover the entire cell coverage area, so called beam sweeping. However, a drawback by using a large number of CSI-RS antenna ports is that the overhead becomes larger and there will hence be less resources available for transmitting the actual data. One possible remedy for this is to operate in hybrid CSI-RS reporting mode, where non-precoded CSI-RS, corresponding to a high number of ports, is transmitted rather infrequently in a UE nonspecific manner; it is instead transmitted in a cell specific manner.

Based on the corresponding CSI-RS reports the eNodeB will be able to decide on a set of channel subspaces where different UEs are located. Since the channels will be correlated in time the eNodeB can further utilize the decided channel subspaces by assuming that the UEs will be located within these also in the following subframes. Hence, it may be sufficient for the eNodeB to transmit UE specific beamformed CSI-RS, corresponding to a low number of ports, within the detected subspaces in the following subframes. If the subspaces are small enough and/or the number of UEs are low enough this will result in a reduced overhead compared to transmitting only non-precoded CSI-RS. Hence, the eNodeB will efficiently be able to obtain high quality CSI with an, on average, lower overhead compared to the case where the eNodeB transmits only non-precoded CSI-RS.

When operating in hybrid CSI mode the eNodeB only sees a subspace of the channel space to a UE when obtaining CSI in the second phase due to the choice of channel subspace which was based on the first phase. However, due to the propagation environment, as well as the movement of the UE, it is possible that the CSI obtained in the first phase is outdated and hence the used subspace is no longer beneficial for transmission to the given UE.

When for instance CSI-RS, or a beam sweeping procedure, is used in the first phase of hybrid CSI mode the reference signals are transmitted in a cell-specific manner. However, in a cell containing many UEs these UEs may experience very different propagation environments. Therefore, some UEs may benefit from more frequent cell-specific transmission of reference signals than others. Hence, when deciding on the transmission periodicity for the reference signals in the first phase the requirements for different UEs may be quite different. One may therefore need to decide on a transmission periodicity which constitutes a tradeoff between the requirements of the different UEs in the cell.

SUMMARY

It is thus an object to provide CSI schemes that are more robust and flexible.

This and other objects are met by embodiments of the proposed technology.

In general terms, according to a first aspect, there is provided a method for managing channel state information in a wireless communication system. The method comprises obtaining, in a first node, of a base set of channel state information of a channel between the first node and a second node based on at least one transmission signal. A dedicated reference signal, specific for a limited set of nodes comprising the second node is transmitted, from the first node, within a channel subspace selected in dependence of the obtained base set of channel state information. At least one common channel state information reference signal specific for an intended coverage area of the first node is transmitted from the first node. The common channel state information reference signal(s) allows obtaining a fall-back set of channel state information of a channel between the first node and the second node based on the common channel state information reference signal(s). The fall-back set of channel state information represents coarser granularity, in spatial dimensions, than the base set of channel state information.

According to a second aspect, there is provided a method for enabling managing of channel state information in a wireless communication system. The method comprises transmitting, from a first node to a second node, of configuration information for the second node enabling acquisition of at least one transmission signal. The transmission signal(s) enables obtaining of a base set of channel state information of a channel between the first node and the second node. Configuration information for the second node enabling acquisition of a dedicated reference signal specific for a limited set of nodes comprising the second node, within a channel subspace, is transmitted, from the first node to the second node. Configuration information for the second node enabling acquisition of at least one common channel state information reference signal specific for an intended coverage area of the first node is transmitted, from the first node to the second node. The common channel state information reference signal(s) allows obtaining a fall-back set of channel state information between the first node and the second node based on the common channel state information reference signal(s). The fall-back set of channel state information representing coarser granularity, in spatial dimensions, than the base set of channel state information.

According to a third aspect, there is provided a node configured to manage channel state information in a wireless communication system. The node is configured to obtain a base set of channel state information of a channel between the node and a second node based on at least one transmission signal. The node is further configured to transmit, within a channel subspace selected in dependence of the obtained base set of channel state information, a dedicated reference signal, specific for a limited set of nodes comprising the second node. The node is further configured to transmit at least one common channel state information reference signal specific for an intended coverage area of the first node. The common channel state information reference signal(s) allows obtaining a fall-back set of channel state information between the first node and the second node based on the common channel state information reference signal(s). The fall-back set of channel state information represents coarser granularity, in spatial dimensions, than the base set of channel state information.

According to a fourth aspect, there is provided a computer program comprising instructions, which when executed by at least one processor, cause the at least one processor to obtain a base set of channel state information of a channel between a first node and a second node based on at least one transmission signal. The instructions, when executed by the processor(s), cause the processor(s) further to transmit, within a channel subspace selected in dependence of the obtained base set of channel state information, a dedicated reference signal, specific for a limited set of nodes comprising the second node. The instructions, when executed by the processor(s), cause the processor(s) further to transmit at least one common channel state information reference signal specific for an intended coverage area of the first node. The common channel state information reference signal(s) allows obtaining a fall-back set of channel state information between the first node and the second node based on the common channel state information reference signal(s). The fall-back set of channel state information represents coarser granularity, in spatial dimensions, than the base set of channel state information.

According to a fifth aspect, there is provided a computer-program product comprising a computer-readable medium having stored thereon a computer program according to the fourth aspect.

According to a sixth aspect, there is provided a carrier comprising the computer program according to the fourth aspect, wherein the carrier is one of an electronic signal, an optical signal, an electromagnetic signal, a magnetic signal, an electric signal, a radio signal, a microwave signal, or a computer-readable storage medium.

According to a seventh aspect, there is provided a node in a wireless communication system for managing channel state information. The node comprises a channel state information obtaining module for obtaining a base set of channel state information of a channel between the node and a second node based on at least one transmission signal. The node further comprises a transmitter module for transmitting, within a channel subspace selected in dependence of the obtained base set of channel state information, a dedicated reference signal, specific for a limited set of nodes comprising the second node, and for transmitting at least one common channel state information reference signal specific for an intended coverage area of the first node. The common channel state information reference signal(s) allows obtaining a fall-back set of channel state information between the first node and the second node based on the common channel state information reference signal(s), which fall-back set of channel state information represents coarser granularity, in spatial dimensions, than the base set of channel state information.

An advantage of the proposed technology is that CSI fall back options are provided in an overhead sparse manner.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

For a better understanding of the proposed technology, it may be useful to begin with a brief overview of MIMO and CSI approaches and a deeper analysis of the technical problem.

Figure 1:
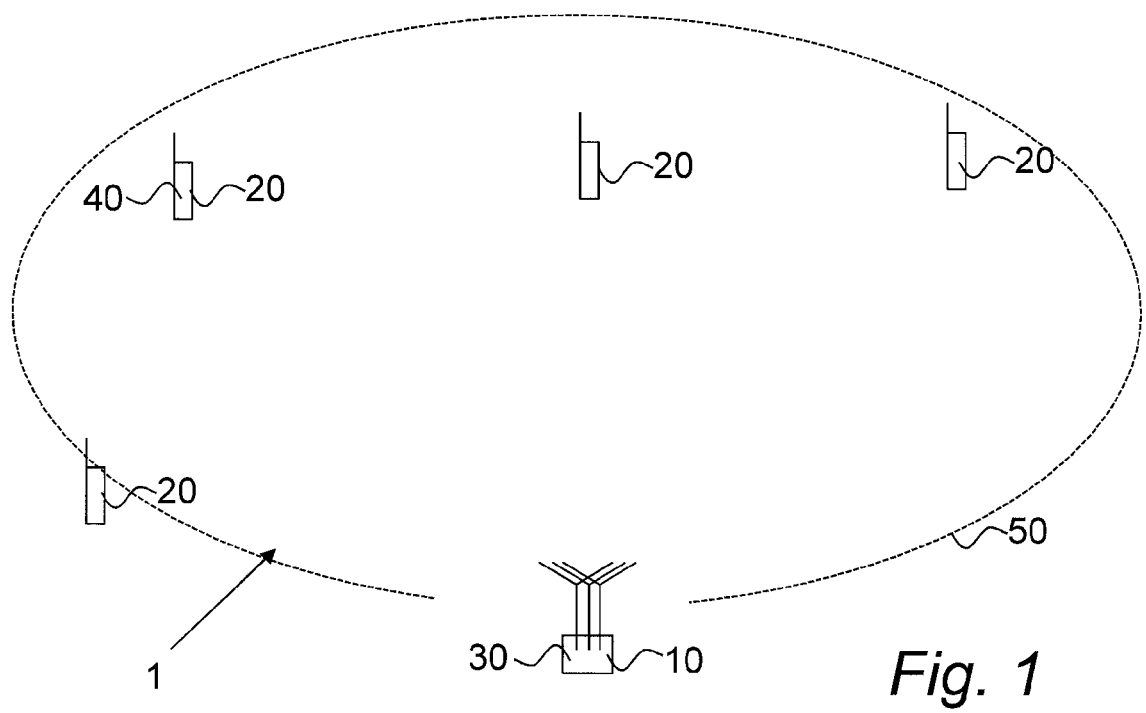
FIG. 1 is a schematic illustration of an example of a wireless communication system.

FIG. 1 illustrates a wireless communication system 1, having a first node 10, in this embodiment a base station (BST) 30. The first node 10 is equipped with an array of antennas for enabling MIMO and/or beamforming approaches. A number of second nodes 20, in this embodiment wireless terminals 40, such as e.g. user equipments (UEs), are present within an intended coverage area 50 of the first node 10. The intended coverage area 50 is the union of all the areas in which the base station 30 is intended to serve UEs. In many cellular communication systems, such an intended coverage area 50 is typically referred to as a "cell".

Figure 2:
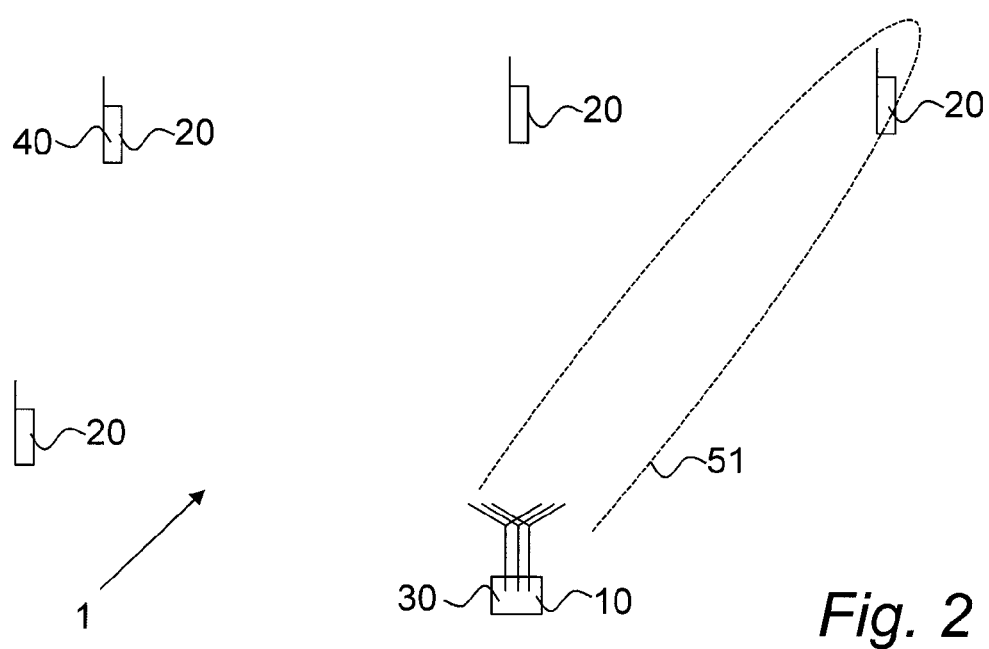
FIG. 2 is a schematic illustration of an example of a wireless communication system utilizing beam forming.

The array of antennas can also be utilized for beamforming operations. A schematic illustration is shown in FIG. 2. In this case, the amplitudes and/or phases of the signals from the antennas of the base station 30 are combined in such a way that the most of the energy of a transmitted radio signal is emitted in a limited radio signal beam 51. Such technologies can be utilized either to improve the communication with certain wireless terminals 40. The radio signal beam 51 may also be moved sequentially, which typically is referred to as beam sweeping. Beamforming and beam sweeping are, as such, well known in prior art, and are therefore not described in any more detail here.

Note that although terminology from 3GPP LTE is used in this disclosure to exemplify the invention, this should not constitute any limitation of the scope of the presented technology to only the aforementioned system. Other wireless systems, especially 5th Generation new radio (5G/NR), Wideband Code Division Multiple Access (WCDMA), WiMax and Global System for Mobile communications (GSM), may also benefit from exploiting the ideas covered within this disclosure.

Also note that terminology such as eNodeB and UE should be considering non-limiting and does in particular not imply a certain hierarchical relation between the two; in general "eNodeB" could be considered as device 1 and "UE" device 2, and these two devices communicate with each other over some radio channel. A "first node" can then be any one of the devices, and a "second node" can be the other one of the devices. Herein, we also focus on wireless transmissions in the downlink, but the invention is equally applicable in the uplink.

Figure 3:
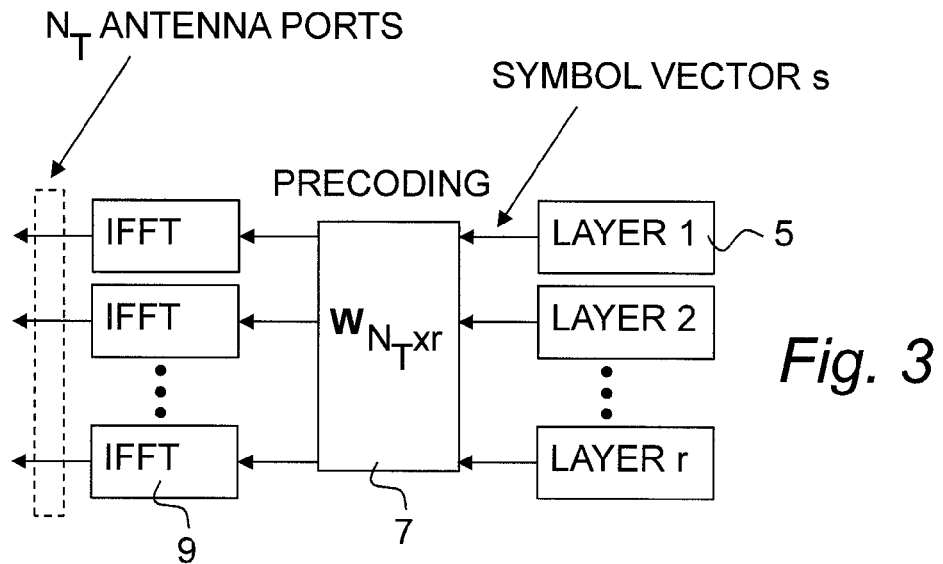
FIG. 3 is an illustration of a spatial multiplexing operation.

As mentioned above, the LTE standard is currently evolving with enhanced MIMO support. LTE release 13 supports spatial multiplexing for 16 Tx antennas with channel dependent precoding. An illustration of the spatial multiplexing operation is provided in FIG. 3.

As seen, the information carrying symbol vector s is multiplied by an $N_T \times r$ precoder matrix W in a precoder 7, which matrix W serves to distribute, via Inverse Fast Fourier Transforms (IFFT) 9, the transmit energy in a subspace of the $N_T$ (corresponding to $N_T$ antenna ports) dimensional vector space. The r symbols in s each correspond to a layer 5 and r is referred to as the transmission rank. In this way, spatial multiplexing is achieved since multiple symbols can be transmitted simultaneously over the same time/frequency resource element (TFRE). The number of symbols r is typically adapted to suit the current channel properties.

LTE uses Orthogonal Frequency-Division Multiplexing (OFDM) in the downlink (and Discrete Fourier Transform (DFT) precoded OFDM in the uplink) and hence the received $N_R \times 1$ vector $y_n$ for a certain TFRE on subcarrier n (or alternatively data TFRE number n) is thus modeled by $$y_n = H_n W s_n + e_n \qquad (1)$$

where $e_n$ is a noise/interference vector obtained as realizations of a random process. The precoder can be a wideband precoder, which is constant over frequency, or frequency selective.

The precoder matrix is often chosen to match the characteristics of the $N_R \times N_T$ MIMO channel matrix $H_n$, resulting in so-called channel dependent precoding. One is often striving for focusing the transmit energy into a subspace which is strong in the sense of conveying much of the transmitted energy to the UE. Furthermore, the transmission rank, and thus the number of spatially multiplexed layers, is reflected in the number of columns of the precoder. For efficient performance it is therefore central to obtain information about the channel $H_n$, the channel state information (CSI).

As mentioned in the background, by measuring on a CSI-RS a UE can estimate the effective channel the CSI-RS is traversing including the radio propagation channel and antenna gains. In more mathematical rigor this implies that if a known CSI-RS signal x is transmitted, a UE can estimate the coupling between the transmitted signal and the received signal (i.e., the effective channel). Hence if no virtualization is performed in the transmission the received signal y can be expressed as $$y = Hx + e \qquad (2)$$

and the UE can estimate the effective channel H.

For CSI feedback LTE has adopted an implicit CSI mechanism where a UE does not explicitly report e.g., the complex valued elements of a measured effective channel, but rather the UE recommends a transmission configuration for the measured effective channel. The recommended transmission configuration thus implicitly gives information about the underlying channel state.

In LTE the CSI feedback is given in terms of a transmission rank indicator (RI), a precoder matrix indicator (PMI), and one or two channel quality indicator(s) (CQI). The CQI/RI/PMI report can be wideband or frequency selective depending on which reporting mode that is configured.

The RI corresponds to a recommended number of streams that are to be spatially multiplexed and thus transmitted in parallel over the effective channel. The PMI identifies a recommended precoder (in a codebook which contains precoders with the same number of rows as the number of CSI-RS ports) for the transmission, which relates to the spatial characteristics of the effective channel. The CQI represents a recommended transport block size (i.e., code rate) and LTE supports transmission of one or two simultaneous (on different layers) transmissions of transport blocks (i.e. separately encoded blocks of information) to a UE in a subframe. There is thus a relation between a CQI and an SINR of the spatial stream(s) over which the transport block or blocks are transmitted.

In the previous description of CSI-RS, so called non-precoded CSI-RS was assumed. This means conceptually that one CSI-RS antenna port is mapped to a single antenna element or antenna subarray of the antenna array. The CSI-RS in this case is then intended to be cell-specific, i.e. broadcasted over the entire intended coverage area. However, as mentioned above, in LTE Rel. 13, a new type of CSI-RS transmitting scheme was introduced. These CSI-RSs are intended to be UE-specific instead of cell-specific, so that each UE is assigned a dedicated CSI-RS resource. Such beamformed or precoded CSI-RS typically contain much fewer ports than non-precoded CSI-RS and typically spans a narrower main beam, as they are typically only intended to cover the UE of interest and not the entire cell coverage area, c.f. FIG. 2. Using LTE terminology, non-precoded CSI-RS transmission schemes are denoted "Class A eMIMO-Type" while beamformed CSI-RS transmission schemes are denoted "Class B eMIMO-Type".

An alternative way of utilizing precoded, or beamformed, CSI-RS is to transmit a sequence of beamformed CSI-RSs in order to cover the entire cell coverage area, so called beam sweeping. The beam sweeping approach is typically a necessity when using analogue beamforming at higher frequencies since the analogue beamforming network is typically wideband so that only a single beam can be transmitted in a given time instance. To cover the entire cell, the CSI-RS beam must be swept sequentially in time. However, beam sweeping is of course applicable to digital beamforming as well. Beam sweeping may be described as transmitting a sequence of different signals $x_k = W_k x'_k$ for different values of k. The UE can then measure the received signal corresponding to each k and feedback CSI corresponding to these measurements. Each precoder $W_k$ will correspond to a certain beam pattern and thus, several different beams are tested and evaluated. A drawback with this approach is that the number of precoders $W_k$ needed to be evaluated becomes quite large when the number of antennas in the array is large since the beam pattern generated by the array typically is very narrow.

For the previous presented CSI-RS and beam sweeping techniques it is assumed that a reference signal is transmitted in the downlink. The UE then measures the reference signal and feeds back CSI to the eNodeB. However, if transmitter-receiver reciprocity can be assumed, the CSI can instead be estimated based on transmissions in the uplink. This is mainly applicable in TDD transmission and then enables a way to obtain CSI based on for instance SRS transmission.

Figure 4:
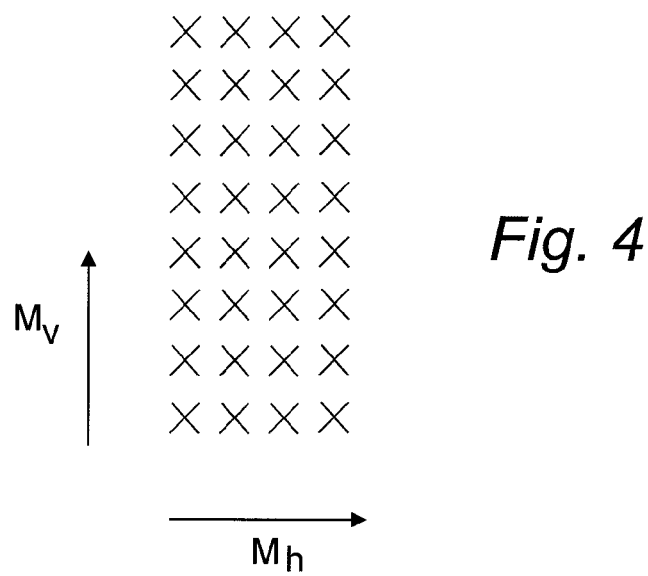
FIG. 4 is an example of an antenna array.

Recent development in 3GPP has led to the discussion of two-dimensional antenna arrays where each antenna element has an independent phase and amplitude control, thereby enabling beamforming in both in the vertical and the horizontal dimension. Such antenna arrays may be (partly) described by the number of antenna columns corresponding to the horizontal dimension $M_h$, the number of antenna rows corresponding to the vertical dimension $M_v$ and the number of dimensions corresponding to different polarizations $M_p$. The total number of antennas is thus $M=M_h M_v M_p$. A special subset of 2D antenna arrays are 1D arrays which is the set of antenna arrays where $M_h=1$ and $M_v>1$ or $M_h>1$ and $M_v=1$. An example of an antenna where $M_h=4$ and $M_v=8$ is illustrated in FIG. 4. It consists of cross-polarized antenna elements meaning that $M_p=2$. We will denote such an antenna as an 8×4 antenna array with cross-polarized antenna elements.

The concept of an antenna element is non-limiting in the sense that it can refer to any virtualization (e.g., linear mapping) of a transmitted signal to the physical antenna elements. For example, groups of physical antenna elements could be fed the same signal, and hence they share the same virtualized antenna port when observed at the receiver. Hence, the receiver cannot distinguish and measure the channel from each individual antenna element within the group of element that are virtualized together. Therefore, when transmitting for instance CSI-RS corresponding to $N_T$ antenna ports it is not necessarily so that $N_T$ equals the number of antenna elements used for the transmission. Hence, the number of antenna elements and the number of antenna ports may or may not need equal each other.

We will furthermore in this document discuss CSI in terms of a large/medium/small number of antenna ports in order to describe how many orthogonal channel measurements, that in principle, are required in order to estimate the CSI. The channel does furthermore not actually have to be measured by the UE on a number of downlink antenna ports, but may equally well, in some embodiments, be measured by the eNodeB in the uplink. In such a case, the granularity of the acquired CSI is dependent on dimensionality of the received signal in the uplink, which corresponds to the granularity of acquired CSI based on a number of antenna ports with the same dimensionality in the downlink.

Furthermore, when discussing antenna ports, the dimensionality will be defined as the number of orthogonal channel measurements, that in principle, are required in order to estimate the resulting channel at a given time frequency resource. Hence, in the case of when an antenna array is used with N ports we will need an N port CSI-RS, in order to estimate the full channel, and consequently the dimensionality is N. When instead receiving a signal, for instance in the base station, utilizing N receiver branches the dimensionally will furthermore be N since this would be the corresponding dimensionality in the downlink.

In general, spanning a channel space with a lower number of antenna ports will provide courser channel estimates than when using a higher number of antenna ports in order to span the same channel space. Hence, applying a higher number of ports, to a given antenna, may provide finer granularity in the channel estimates. Consequently, a set of CSI corresponding to X ports is defined to have coarser granularity than another set of CSI corresponding to Y ports if X<Y.

Figure 5:
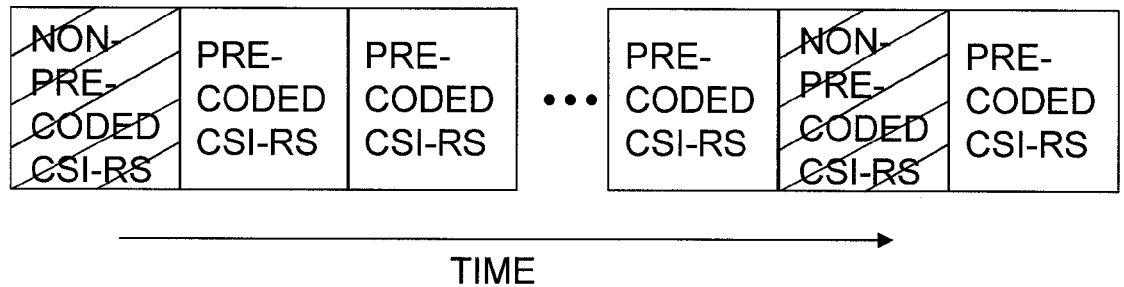
FIG. 5 illustrates a typical way to operate with hybrid CSI-RS reporting.

In LTE release 13 support for 16 antenna ports CSI-RS was introduced and 32 antenna ports will be specified in release 14. In NR, 32 or 64 antenna ports will likely be supported from the start. This enables powerful MIMO schemes which can radically improve system performance. As mentioned in the background, a drawback by using a large number of CSI-RS antenna ports is that the overhead becomes larger and there will hence be less resources available for transmitting the actual data. One possible remedy for this is to operate in hybrid CSI-RS reporting mode. The typical way to operate with hybrid CSI-RS reporting is illustrated in FIG. 5. The non-precoded CSI-RS, corresponding to a high number of ports, is transmitted rather infrequently in a UE nonspecific manner; it is instead transmitted in a cell specific manner. Based on the corresponding CSI-RS reports the eNodeB will be able to decide on a set of channel subspaces where different UEs are located. Since the channels will be correlated in time the eNodeB can further utilize the decided channel subspaces by assuming that the UEs will be located within these also in the following subframes. Hence, it may be sufficient for the eNodeB to transmit UE specific beamformed CSI-RS, corresponding to a low number of ports, within the detected subspaces in the following subframes. If the subspaces are small enough and/or the number of UEs are low enough this will result in a reduced overhead compared to transmitting only non-precoded CSI-RS. Hence, the eNodeB will efficiently be able to obtain high quality CSI with an, on average, lower overhead compared to the case where the eNodeB transmits only non-precoded CSI-RS.

It should be noted that the procedure above essentially describes two phases:

Phase 1: Obtain CSI corresponding to a large number of ports and decide on a set of UE specific subspaces. We will refer to this CSI as the "base set of CSI".

Phase 2: Obtain CSI for a UE using the decided UE specific subspace. We will refer to this CSI as the "dedicated set of CSI".

It should be noted that although we in the previous description performed these two phases by transmitting CSI-RS this is not the only way. We could for instance in the first phase instead rely on reciprocity or a beam sweeping procedure in order to obtain the required CSI. In the second phase we could utilize a beam sweeping procedure in order to obtain CSI. Hence, there are a number of different flavors of hybrid CSI schemes based on the same main principle.

There are many situations where hybrid CSI schemes are applicable. We list a few examples below:

When using an antenna array with many steerable antennas (corresponding to a large number of antenna ports): Here we can in the first phase of the hybrid CSI scheme obtain CSI corresponding to a large number of antenna ports. This CSI will then be used to decide on a set of subspaces/spatial directions where the different UEs are located. These subspaces will then be used in the second phase by for instance transmitting precoded UE specific CSI-RS within the set if subspaces/spatial directions.

When using a large 2D antenna array corresponding to a large number of antenna ports: Here we can in the first phase obtain two sets of CSI where each set corresponds to one spatial domain. One may for instance use two CSI-RS processes where one of the processes corresponds to CSI in the elevation domain and the other set corresponds to CSI in the horizontal domain. By jointly utilizing these two sets of CSI we can in the first phase decide on a set of subspaces to be used in the second phase. These subspaces will then be used in the second phase by for instance transmitting precoded CSI-RS within the subspaces. This approach may be efficient in cases where for instance the CSI in the elevation domain has a longer coherence time than the CSI in the horizontal domain.

In cases where the CSI can be divided into wideband and subband CSI in the frequency domain: Here the wideband CSI may be obtained in the first phase and a potentially frequency dependent subspace is decided. In the second phase, subband CSI is obtained by for instance transmitting precoded CSI-RS within the frequency dependent subspace.

In cases when the CSI can be divided into co-phasing CSI within the same polarization and co-phasing between polarization CSI: Here the co-phasing CSI typically changes less rapidly and can thus be obtained in the first phase in order to decide on a subspace. The co-phasing of the polarizations typically changes more rapidly and therefore can be obtained in the second phase by for instance transmitting precoded CSI-RS within the decided subspace.

The herein presented technology proposes to combat the shortcomings of hybrid CSI mode by obtaining one additional, third, set of CSI in a cell specific manner, in this disclosure denoted as a fall-back set of CSI. This additional set of CSI only corresponds to a coarse estimate of the channel but can be used for UEs where the dedicated set of CSI corresponds to less beneficial channel conditions than the channel conditions estimated by the fall-back set of CSI.

Due to the propagation environment, as well as the movement of the UE, it is possible that the CSI obtained in the first phase, the base set of CSI, is outdated and hence the used subspace is no longer beneficial for transmission to the given UE in the second phase. Therefore, providing another set of CSI corresponding to a coarse estimate of the entire channel provides a fall back option. In terms of overhead the cost of this additional fall-back set of CSI can be quite low since one only is aiming for a coarse estimate of the channel. The fall-back set of CSI may also be created in a non UE specific manner which is beneficial in the case when using CSI-RS or beam sweeping since the overhead does not scale with the number of users.

Furthermore, in a cell containing many UEs these UEs may experience very different propagation environments. Consider for instance the case of a cell with two UEs. The first UE is traveling with a high speed and is experiencing severe fading. The second UE is on the other hand not moving and is only experiencing limited fading. In such a situation one would when using the conventional hybrid CSI approach typically design the periodicity of the first phase according to a worst case strategy (i.e. the first UE from the example). However, with the technology here presented the base set of CSI could still be obtained rather infrequently. This may be insufficient for the first UE but since it has access to the fall-back set of CSI, it can fall back to using this coarser channel estimate when it is detected that the dedicated set of CSI is no longer beneficial due to that the decided subspace from phase 1 is outdated. Hence, with the proposed technology one no longer need to design the phase 1 periodicity according to a worst case (i.e. worst UE) strategy.

In the present description, sets of CSI are discussed. A set of CSI may for instance be one or more of CQI, RI, CSI-RS Resource Indicator (CRI) and PMI which is commonly the case in LTE. It may also be information about the entire channel matrix in an explicit manner, or second order statistics of the channel such as a covariance matrix.

The signals used for enabling obtaining of a set of CSI are in the present disclosure denoted as "transmission signals". In a typical case, these transmission signals are reference signals. However, there are also other types of transmission signals that could be utilized in a similar manner. In one case the transmission corresponds to a data transmission.

Figure 6:
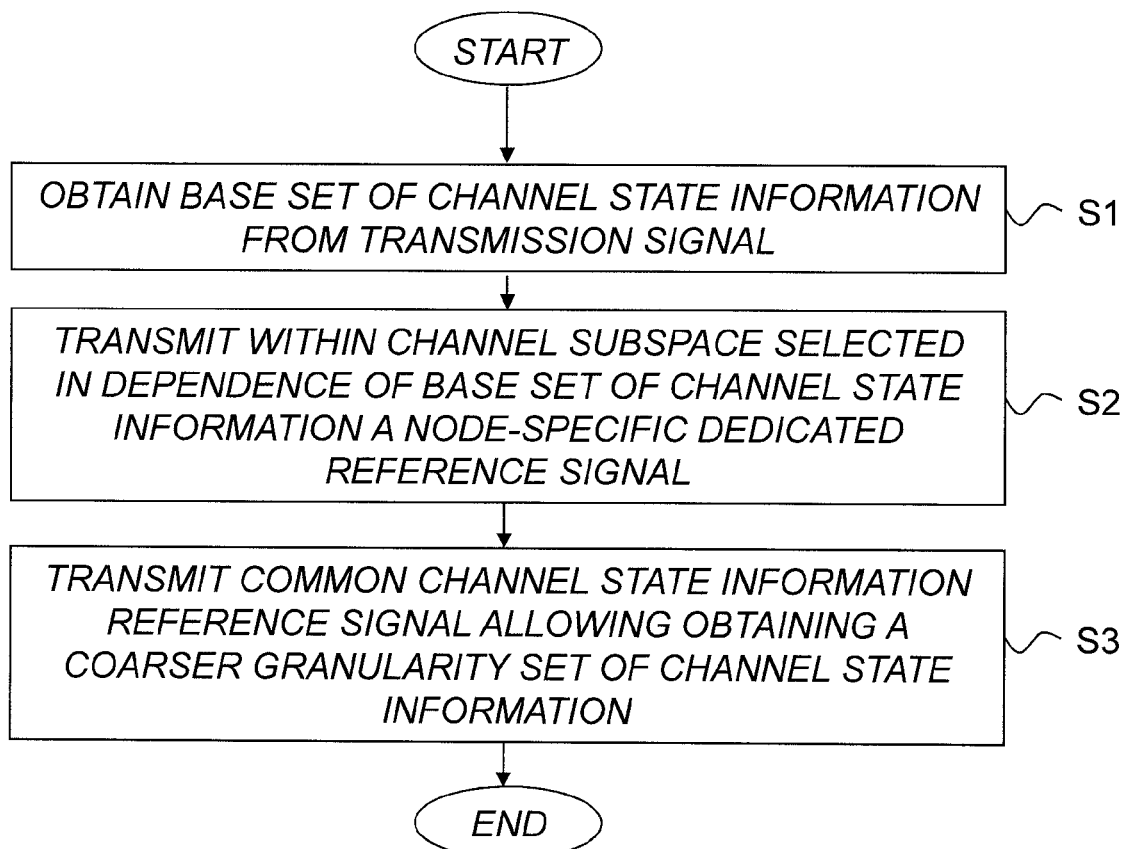
FIG. 6 is a flow diagram of steps of an embodiment of a method for managing CSI in a wireless communication system.

FIG. 6 is a schematic flow diagram illustrating an example of a method for managing CSI in a wireless communication system. In step S1, a base set of CSI is obtained in a first node. The base set of CSI relates to a channel between the first node and a second node and is based on at least one transmission signal.

In step S2, a dedicated reference signal is transmitted from the first node. The dedicated reference signal is transmitted within a channel subspace that is selected in dependence of the obtained base set of CSI. In a typical embodiment, the dedicated reference signal is specific for the UE. In an alternative embodiment the same dedicated reference signal may be transmitted to a limited set of the second type of nodes. The same dedicated reference signal may be used to two or more nodes of the second type.

In step S3, at least one common CSI reference signal is transmitted from the first node. The common CSI reference signal(s) is specific for an intended coverage area of the first node. The common CSI reference signal(s) allows obtaining a fall-back set of CSI of a channel between the first node and the second node based on the common CSI reference signal(S). The fall-back set of CSI represents coarser granularity, in spatial dimensions, than the base set of CSI.

In the following, several embodiments of the proposed technology are described. In one embodiment two hybrid CSI phases are as follows:

Phase 1: Obtain a base set of CSI corresponding to a large number of ports and decide on a set of UE specific channel subspaces. A "channel subspace" is a space spanned by a function that projects the full channel space onto a, potentially linear, subspace. Hence, we may define a UE specific channel subspace by defining a virtualization matrix that projects the full channel space onto a linear subspace of the full channel space. In one embodiment the base set of CSI describes the channel in terms of one DFT beam in the spatial dimension. The subspace may in such a case correspond to this DFT beam. In another embodiment the base set of CSI corresponds to a set of DFT beams and the subspace is chosen among this set of DFT beams.

Phase 2: Obtain a dedicated set of CSI for a UE or set of UEs using the decided UE specific channel subspace. Furthermore, also obtain a fall-back set of CSI, where this fall-back set of CSI corresponds a lower number of ports, and thus, provides a coarser granularity estimate of the full channel space than that of the base set CSI.

TABLE 1

Characteristics of the different sets of CSI.

| Set of CSI | Dimension of desired measured subspace | Dimension of measurem. (No. of corresp. antenna ports) | Resulting granularity of measurem. | Associated overhead | Frequency of CSI acquis. |
|---|---|---|---|---|---|
| Base set | High | High | High | High | Low |
| Ded. set | Low | Low | High | Low | High/ Medium/ Low |
| Fall-back set | High | Low/Medium | Low/ Medium | Low/ Medium | High/ Medium/ Low |

The dedicated set of CSI typically corresponds to a low number of ports. However, since the UE-specific channel subspace is typically of low dimension as well, using a low number of ports is sufficient to capture said UE-specific channel subspace with a fine granularity.

In one embodiment, a list of typical, but not exclusive, characteristics of the different sets of CSI is summarized in Table 1 above.

In one embodiment of the invention, the base, dedicated and fall-back sets of CSI are obtained by transmitting CSI-RS from the first node and receiving CSI associated with each of these sets of CSI from the second node. We will then refer to the CSI-RS as "base CSI-RS", "dedicated CSI-RS" and "common CSI-RS" respectively.

The transmission signal on which the base set of CSI is based would then constitute a non-precoded CSI-RS corresponding to a large number of antenna ports. In other words, the transmission signal is a CSI-RS. This CSI-RS may be transmitted in a cell specific manner. In other words, the transmission signal comprises reference symbols specific for the intended coverage area of the first node. Thus, the obtaining of the base set of CSI comprises transmitting the transmission signal from the first node. The second node will detect the signal and with knowledge of the reference symbols, CSI can be deduced. The second node transmits information associated with the base set of CSI, which is received in the first node.

The second, dedicated, set of CSI-RSs corresponds to a set of precoded CSI-RSs transmitted in a UE specific manner. In other words, the dedicated reference signal comprises precoded reference symbols specific for the second node. Each of these precoded CSI-RSs typically correspond to a low number of antenna ports. Also here, the second node will detect the signal and with knowledge of the reference symbols, CSI can be deduced. The second node transmits information associated with the dedicated set of CSI of a channel between said first node and said second node based on said dedicated reference signal, which dedicated set of CSI is received in the first node. In some embodiment the sequence of the CSI-RS may be used not only for one specific UE but also be re-used for dedicated transmission to another UE in the cell. There might be a shortage of CSI-RS sequences and then two UEs locates such that their respective beam directions are separate may be dedicated the same CSI-RS.

Furthermore, the fall-back set of CSI is obtained by transmitting CSI-RS in a cell-specific manner. In other words, a common CSI reference signal comprises reference symbols specific for the intended coverage area of said first node. (Note that the common CSI reference signal should not be confused with the Cell-specific Reference Signal (CRS) as defined in LTE.) The CSI-RS will be sent using a lower number of antenna ports than the CSI-RS transmitted in the first phase. Hence, in terms of overhead the fall-back stage transmission of the common CSI-RS will be less expensive than the transmission of the base CSI-RS from the first phase. The second node will detect the signal and with knowledge of the reference symbols, CSI can be deduced. The second node transmits information associated with the fall-back set of CSI. This information associated with the fall-back set of CSI concerns the channel between the first node and the second node and is based on the common CSI reference signal. This information associated with the fall-back set of CSI is received in the first node from the second node.

In one embodiment, the dedicated set of CSI-RSs and the common CSI-RS are transmitted using one or more Class B eMIMO-type CSI processes. Hence, a given UE listens to a Class B eMIMO-type process containing a UE specific CSI-RS (denoted the dedicated CSI-RS), corresponding to the dedicated set of CSI, as well as the CSI-RS corresponding to the fall-back set of CSI. In one such embodiment, the dedicated and common CSI-RS correspond to different Non-Zero Power (NZP) CSI-RS resources within one CSI process and the UE dynamically selects the best NZP CSI-RS resource with a CSI Resource Indicator (CRI) and reports back CSI only for the selected resource (i.e. it chooses either the dedicated or common CSI-RS and reports back either the dedicated set of CSI or the fall-back set of CSI in a given reporting instance). In another such embodiment, the UE is configured with separate CSI processes for the dedicated and common CSI-RS and so reports back CSI for both the dedicated set and the fall-back set at each reporting occasion.

In one embodiment, the periodicity of CSI-RS for the dedicated and fall-back set of CSI are identical, hence the dedicated reference signal and common CSI-RS are transmitted equally often. The dedicated CSI reference signal is typically transmitted more frequently than the transmission signal, as in prior art hybrid CSI approaches. The common CSI reference signal is in one embodiment also transmitted more frequently than the transmission signal(s).

In another embodiment the periodicity is not identical, the common CSI-RS may for instance be transmitted less frequently than the dedicated set of CSI-RSs. In other words, the common CSI reference signal is transmitted less frequently than said dedicated reference signal.

The eNodeB will based on these sets of CSI-RSs obtain satisfying channel estimates for a UE. In the first phase the eNodeB has access to the fine granularity channel estimate provided by the transmission signal, i.e. in this embodiment the base CSI-RS. In the second phase the eNodeB has access to the, UE specific, dedicated CSI-RSs as well as the fall back option of the common CSI-RS which corresponds to a coarser granularity estimate of the channel. Hence, the eNodeB will be able to ensure efficient data transmission to the UE in both the first and second phases.

In one embodiment the base and/or common CSI-RS is cell specific in the sense that it is intended for multiple UEs in the cell, if 3rd Generation Partnership Project (3GPP) LTE terminology is used. In more general words, the transmission signal(s) and the common CSI reference signal(s) are considered as being specific for an intended coverage area of the first node. There may however also exist other UEs, for instance legacy UEs, for which these cell specific CSI-RSs not are intended.

In one embodiment the transmission signal(s), e.g. the base reference signal, is transmitted in an aperiodic manner. The time instants when the base reference signal is transmitted may be based on the received reports from the dedicated and common CSI-RSs. When UEs served by a given base station to a large extent start to rely of the common CSI-RS, this may motivate a transmission of a new set of base CSI-RS.

There are different ways of generating coarser granularity CSI. One approach is to use only part of the antenna array. To this end, in one embodiment, the fall-back set of CSI, corresponding to a lower number of ports than the base set of CSI in the first phase, is obtained by essentially turning off a number of the antenna ports. Hence, only a subset of the ports are used in the CSI acquisition. In the case of CSI-RS, this would mean that the number of antenna ports in the CSI-RS is reduced and the reported CSI would correspond to CSI as if only a part of the antenna array was used. This will consequently constitute a coarser granularity version of the channel estimate than the CSI in the first phase but at a lower overhead cost.

Figure 7:
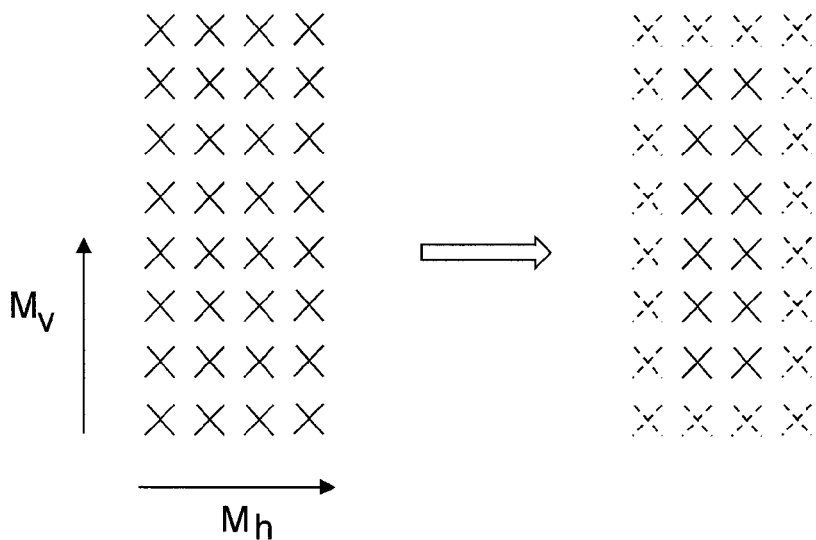
FIG. 7 is an illustration of example of lowering the dimensionality of an antenna array.

In FIG. 7 one such embodiment is illustrated. Here an 8×4 antenna, where we assume one antenna port per physical antenna, is used. In order to obtain the fall-back set of CSI most of the antenna ports has been turned off as illustrated by the broken antenna elements in the right part of the figure. Only the 4×2 solid black cross polarized antenna elements/antenna ports are assumed to be active meaning that the UE will effectively experience a 4×2 antenna port layout. Hence, for the base set of CSI an 8×4 antenna port layout may be used whereas a 4×2 antenna port layout may be used for the fall-back set of CSI.

In one embodiment, the common CSI reference signal(s) has a lower dimensionality than the transmission signal(s). In other words, the granularity of the common CSI-RS may be courser than the granularity provided from the transmission signal(s). In one further embodiment, the common CSI reference signal(s) is transmitted utilizing a number of antenna ports that is smaller than the number of antenna ports used for transmitting the transmission signal(s). In one embodiment, the common CSI reference signal(s) is transmitted from only a subset of the antenna ports from which the transmission signal(s) is transmitted. In a further embodiment, the common CSI reference signal(s) is transmitted while a number of antenna ports from which the transmission signal(s) is transmitted are turned off.

Lowering the dimensionality of the common CSI reference signal(s) and/or the dedicated reference signal can also be performed by use of the entire array, but with performing virtualization. In one embodiment the available antenna ports are virtualized utilizing a port reducing virtualization strategy. Hence, here one would use all available antenna ports, but virtualize them in such a manner that only a subspace of the channel is seen. In one embodiment the virtualization matrix is designed in such a way that the resulting granularity is substantially similar to the resulting granularity when turning off a number of antenna ports. Hence, in terms of beams experienced by the UE they have very similar properties for the both cases.

In one embodiment the virtualization, and hence the observable subspace, is designed in such a way that the subspace corresponds to a wider area in the angular domain, but with low resolution within the angular area. The entire cell coverage area could then be covered with a low number of ports, albeit with a coarse angular granularity. This would thereby reduce the number of required ports needed to see the entire observable channel which in turn would reduce the cost in terms of overhead as well as producing coarser granularity CSI.

In other words, in one embodiment, the common CSI reference signal(s) is transmitted utilizing a port reducing virtualization strategy in comparison with the transmission signal(s). In a further embodiment, the excitation weights of antenna ports of the common CSI reference signal(s) is formed using a linear combination of excitation weights of antenna ports of the transmission signal(s).

In another embodiment only a subset of the cell coverage area is covered by designing a virtualization that mainly covers a subset of the cell coverage area.

In one embodiment a port reducing virtualization is used in such a way that a M×N port layout is transformed into a Q×P port layout where M>Q and/or N>P. Port layout here refers to the spatial distribution of the phase centers of the antenna ports in a two-dimensional plane. FIG. 7 may be used to illustrate also such an embodiment, here with an 8×4 antenna. Here, one antenna port per physical antenna, is assumed to be used. In order to obtain the fall-back set of CSI the antenna ports are virtualized so that they correspond to another port layout as illustrated by the broken antenna elements in the right part of the figure. It is hence assumed that the 8×4 antenna ports in the left part of the figure are virtualized such that a corresponding 4×2 port layout is obtained as illustrated in the right part of the figure. Hence, by utilizing such a technique the UE may observe something which is essentially equivalent to a 4×2 antenna port layout. The 4×2 antenna port layout would in turn provide a coarser granularity estimate of the channel at a lower overhead cost compared to the 8×4 port layout.

There are also possibilities to use other means than CSI-RS to obtain CSI. In one embodiment, the transmitting of the transmission signals comprises beam sweeping within the intended coverage area of the first node. Based on this beam sweeping a base set of CSI can be deduced.

In one embodiment a beam sweeping procedure is used in order to obtain the fall-back set of CSI. In other words, the transmitting of the common CSI reference signals comprises beam sweeping within the intended coverage area of the first node. The same approach concerning the granularity could also be applied when utilizing beam sweeping. Turning off a number of antenna ports will imply that a lower number of beams in the beam sweep has to be evaluated in order to observe the whole channel. Hence, the overhead will go down. On the other hand, the beams will, potentially, be wider and the obtained channel estimate will be of coarser granularity.

In one further embodiment a port reducing virtualization strategy is used when utilizing beam sweeping.

In another embodiment reciprocity is instead used in order to obtain the base set of CSI in the first phase. In other words, the obtaining of the base set of CSI comprises receiving said at least one transmission signal from the second node in the first node. Furthermore, the base set of CSI for the channel between the first node and the second node is determined by utilizing transmitter-receiver reciprocity.

A hybrid mode between wideband and subband CSI may also be utilized. In one embodiment, the CSI can be divided into wideband and subband CSI in the frequency domain. Here, the wideband CSI may be obtained in the first phase and a potentially frequency dependent subspace is decided. In the second phase subband CSI is obtained by for instance transmitting precoded CSI-RS within the potentially frequency dependent subspace. A fall-back set of CSI could then constitute CSI-RS, or a beam sweeping procedure, corresponding to a lower number of ports providing both wideband and subband CSI.

Figure 8:
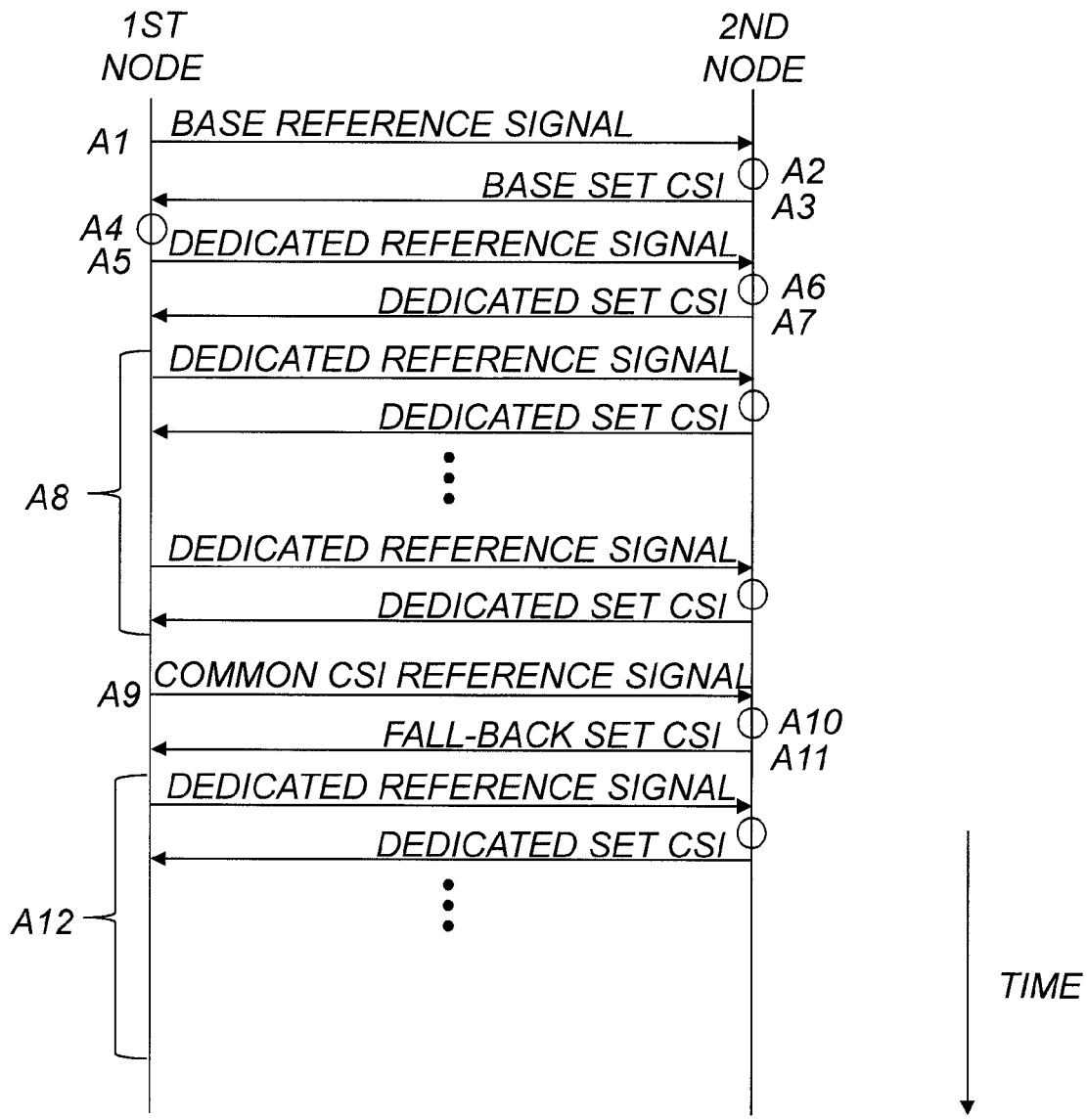
FIGS. 8-10 are examples of signaling for managing CSI in a wireless communication system.

In FIG. 8, a signaling scheme of an embodiment of a method for managing CSI is illustrated. The figure illustrates the signals exchanged between a first node and a second node 20. At A1, a transmission signal, in this embodiment a base reference signal, is transmitted from the first node 10 to the second node 20. At A2, the second node 20 utilizes the received base reference signal to estimate the channel between the first 10 and second node 20. At A3, information related to the channel estimate is transmitted back to the first node 10 as a base set of CSI. At A4, the first node 10 utilizes the received information about the estimated channel to select a suitable channel subspace for the second node 20, i.e. in dependence of the obtained base set of CSI. At A5, a dedicated reference signal is transmitted within the selected channel subspace. At A6, the second node 20 utilizes the received dedicated reference signal to estimate a dedicated set of CSI, which is transmitted back at A7. This is repeated a number of times during A8. At A9, a common CSI reference signal is transmitted from the first 10 to the second node 20. At A10, the common CSI reference signal is used by the second node 20 to obtain a fall-back set of CSI, which is transmitted back at A11. During A12, transmission of dedicated reference signal is continued. Further common CSI reference signals and base reference signals are provided at suitable intervals.

Figure 9:
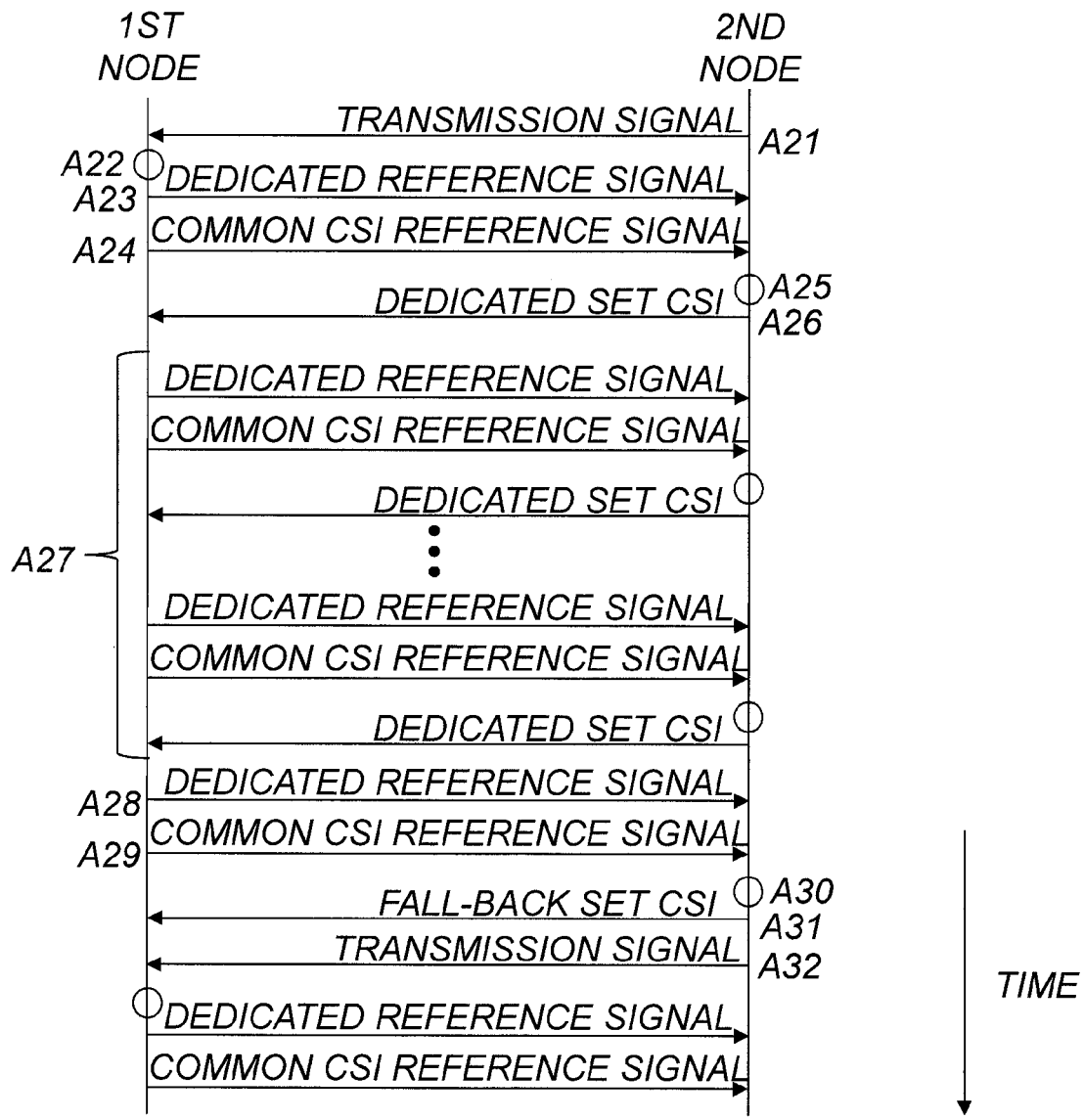

In FIG. 9, a signaling scheme of another embodiment of a method for managing CSI is illustrated. The figure illustrates the signals exchanged between a first node 10 and a second node 20. At A21, a transmission signal is received in the first node 10 from the second node 20. At A22, the transmission signal is used to derive the base set of CSI utilizing transmitter-receiver reciprocity. Also at A22, the first node 10 utilizes the derived base set of CSI to select a suitable channel subspace for the second node 20. At A23, a dedicated reference signal is transmitted within the selected channel subspace. At A24, a common CSI reference signal is transmitted from the first 10 to the second node 20. At A25, the second node 20 utilizes the dedicated reference signal and the common CSI reference signal to estimate the channel. The second node 20 finds here that the dedicated reference signal gives the best estimation and a dedicated set of CSI is returned at A26. The same procedure as for A23-A26 is repeated a number of times during A27. At A28 and A29, a dedicated reference signal and a common CSI reference signal are transmitted. At A30, the second node 20 now finds that the common CSI reference signal gives the best channel estimation and a fall-back set of CSI is returned at A31. The selection of the fall-back set of CSI indicates that the base set of CSI probably is outdated and the procedure starts all over again.

Figure 10:
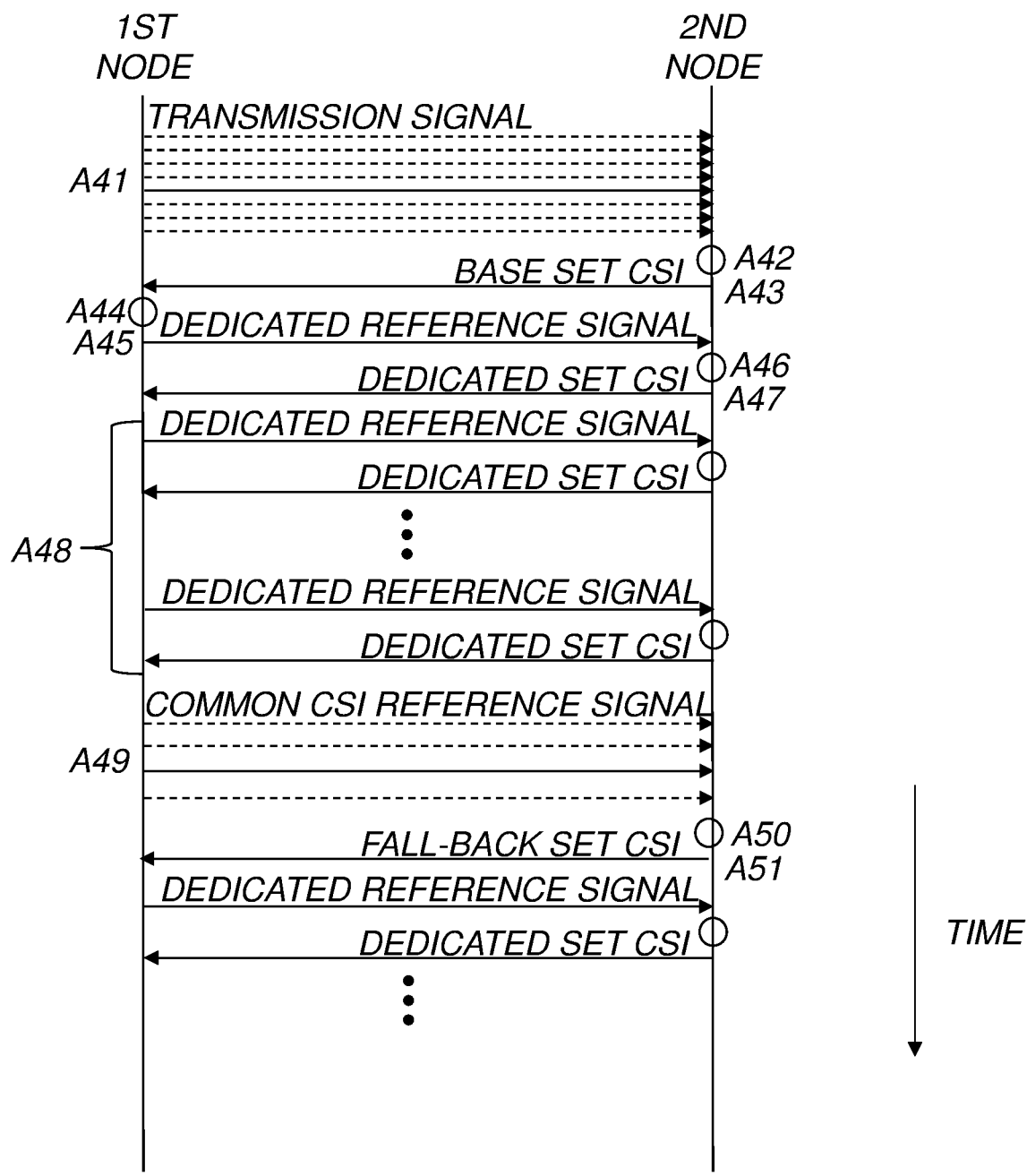

In FIG. 10, a signaling scheme of another embodiment of a method for managing CSI is illustrated. The figure illustrates the signals exchanged between a first node 10 and a second node 20. At A41, a multitude of beam formed transmission signals are transmitted from the first node in a beam sweeping operation. At least one of the transmission signals is detected by the second node 20 and at A42, the second node 20 utilizes the received transmission signal to estimate the channel between the first 10 and second node 20. At A43, information related to the channel estimate is transmitted back to the first node 10 as a base set of CSI. At A44, the first node 10 utilizes the received information about the estimated channel to select a suitable channel subspace for the second node 20, i.e. in dependence of the obtained base set of CSI. At A45, a dedicated reference signal is transmitted within the selected channel subspace. At A46, the second node 20 utilizes the received dedicated reference signal to estimate a dedicated set of CSI, which is transmitted back at A47. This is repeated a number of times during A48. At A49, a multitude of beam formed reference signals are transmitted from the first node 10 in a beam sweeping operation. These beam formed common CSI reference signals have a generally broader extension than the beam formed transmission signals used for the base set of CSI. At least one of the common CSI reference signals is detected by the second node 20 and at A50, the second node 20 utilizes the received common CSI signal to estimate the channel between the first 10 and second node 20. At A51, information related to the fall-back set of CSI is transmitted back to the first node 10. The procedure then continues with further dedicated reference signalling.

The FIGS. 8 to 10 should be seen as illustrative non-exclusive examples of some possibilities to vary the properties of the transmission signal, the dedicated reference signal and the common CSI reference signal, and should not be considered as a full set of examples.

Figure 11:
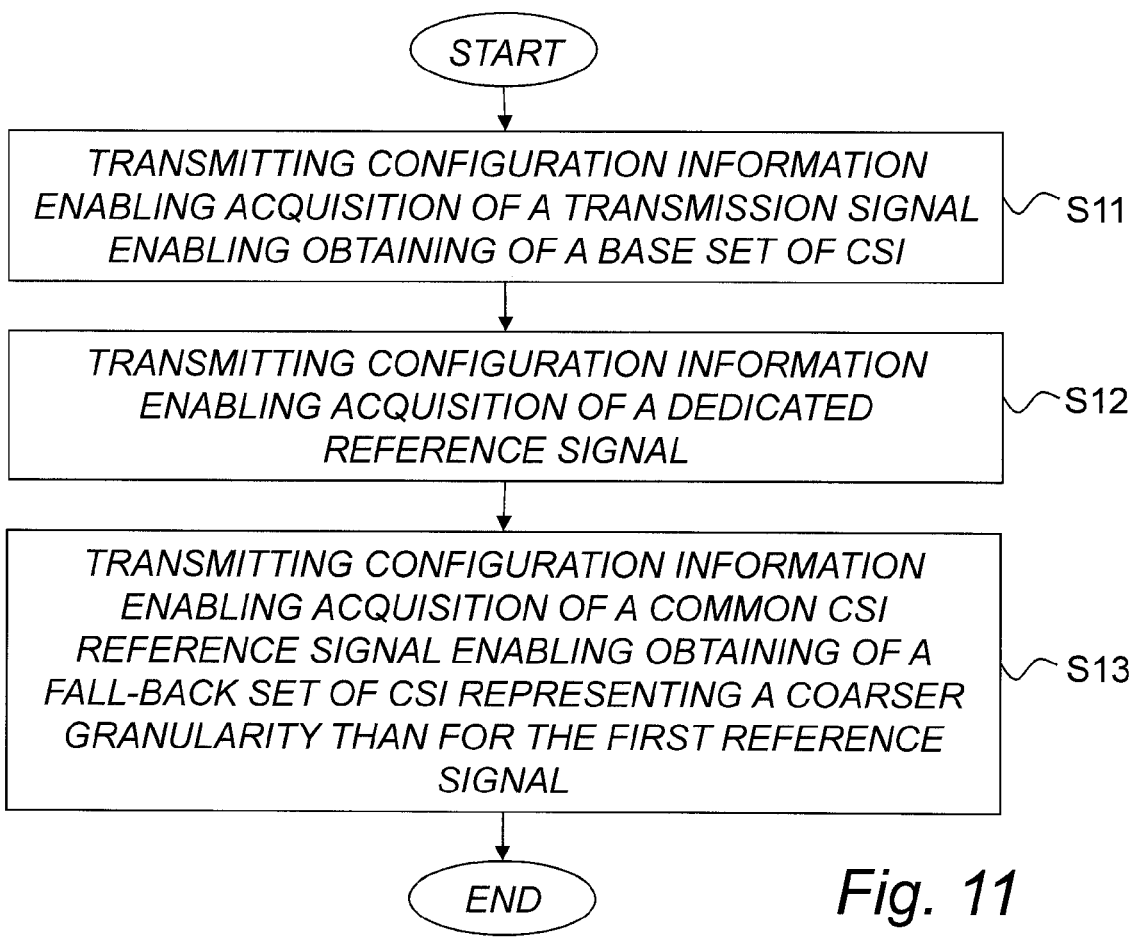
FIG. 11 is a flow diagram of steps of an embodiment of a method for enabling managing CSI in a wireless communication system.

In one aspect of the present technology, the second node has to be supplied with appropriate configuration information in order to acquire suitable transmission signals and reference signals. FIG. 11 illustrates steps of an embodiment of a method for enabling managing of CSI in a wireless communication system. In step S11, configuration information is transmitted from a first node to a second node. This configuration information is intended for the second node and enables acquisition of at least one transmission signal. The transmission signal(s) enables obtaining of a base set of CSI of a channel between the first node and the second node. In step S12, configuration information is transmitted from the first node to the second node. This configuration information is intended for the second node and enables acquisition of a dedicated reference signal, specific for the second node, within a channel subspace. In step S13, configuration information is transmitted from the first node to the second node. This configuration information is intended for the second node and enables acquisition of at least one common CSI reference signal specific for an intended coverage area of the first node. The common CSI reference signal(s) allows estimating of a fall-back set of CSI between the first node and the second node based on the common CSI reference signal(s). The fall-back set of CSI represents coarser granularity, in spatial dimensions, than the base set of CSI.

As used herein, the non-limiting terms "User Equipment (UE)", "station (STA)", "wireless terminal" and "wireless communication device" may refer to a mobile phone, a cellular phone, a Personal Digital Assistant (PDA) equipped with radio communication capabilities, a smart phone, a laptop or Personal Computer (PC) equipped with an internal or external mobile broadband modem, a tablet PC with radio communication capabilities, a target device, a device to device UE, a machine type UE or UE capable of machine to machine communication, iPAD, Customer Premises Equipment (CPE), Laptop Embedded Equipment (LEE), Laptop Mounted Equipment (LME), Universal Serial Bus (USB) dongle, a portable electronic radio communication device, a sensor device equipped with radio communication capabilities or the like. In particular, the term "UE", the term "Station", the term "wireless terminal" and the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

As used herein, the non-limiting term "node" or "network node" may refer to base stations, access points, network control nodes such as network controllers, radio network controllers, base station controllers, access controllers, and the like. In particular, the term "base station" may encompass different types of radio base stations including standardized base stations such as Node Bs, or evolved Node Bs (eNB) and also macro/micro/pico radio base stations, home base stations, also known as femto base stations, relay nodes, repeaters, radio access points, Base Transceiver Stations (BTS), and even radio control nodes controlling one or more Remote Radio Units (RRU), or the like.

In the following, the general non-limiting term "communication unit" includes network nodes and/or associated wireless devices.

As used herein, the term "network device" may refer to any device located in connection with a communication network, including but not limited to devices in access networks, core networks and similar network structures.

The term network device may also encompass cloud-based network devices.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to an aspect of the proposed technology there is provided an arrangement configured to manage CSI in a wireless communication system. A node comprising such arrangement is configured to obtain a base set of CSI of a channel between the node and a second node based on at least one transmission signal. The node is further configured to transmit, within a channel subspace selected in dependence of the obtained base set of CSI, a dedicated reference signal, specific for the second node. The node is further configured to transmit at least one common CSI reference signal specific for an intended coverage area of the first node. The common CSI reference signal(s) allowing obtaining a fall-back set of CSI between the first node and the second node based on the common CSI reference signal(s). The fall-back set of CSI represents coarser granularity, in spatial dimensions, than the base set of CSI.

Figure 12:
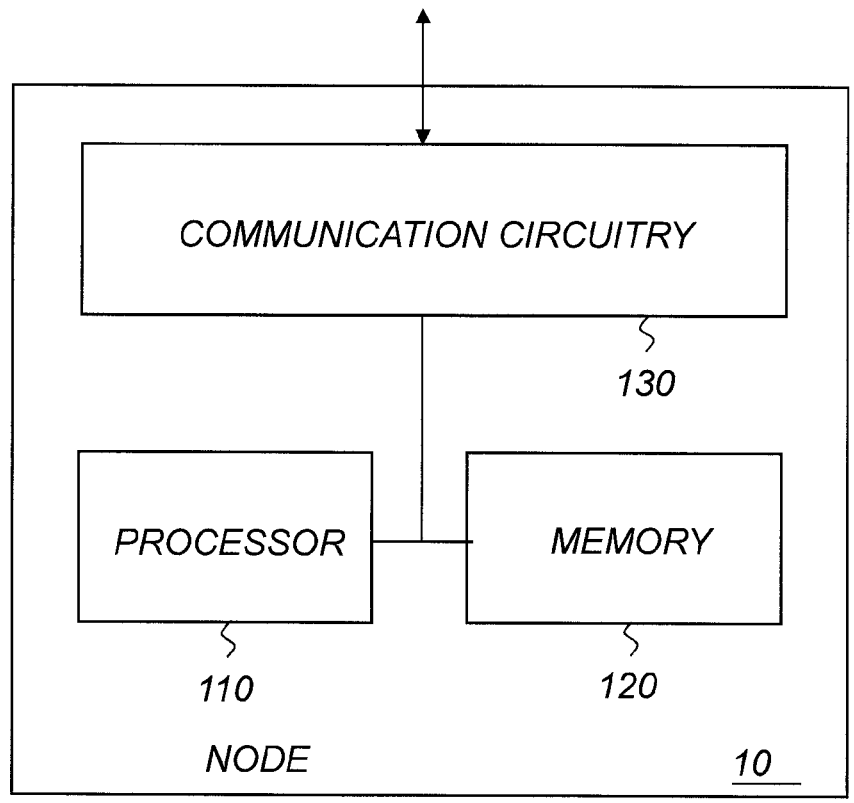
FIG. 12 is a schematic block diagram illustrating an embodiment of a node for managing CSI in a wireless communication system.

FIG. 12 is a schematic block diagram illustrating an example of a node 10, based on a processor-memory implementation according to an embodiment. In this particular example, the node 10 comprises a processor 110 and a memory 120, the memory 120 comprising instructions executable by the processor 110, whereby the processor is operative to obtain said base set of CSI. Preferably, the processor 110 is operative to select the channel subspace in dependence of the obtained base set of CSI. Preferably, the processor 110 is operative to manage any sets of CSI obtained from the second node. In one embodiment, the processor 110 is operative to determine the base set of CSI for the channel between the first node and the second node from a received transmission signal or signals by utilizing transmitter-receiver reciprocity. Preferably, the processor 110 is operative to provide configuration information for the second node enabling acquisition of the transmission signal(s), configuration information for the second node enabling acquisition of the dedicated reference signal and configuration information for the second node enabling acquisition of the common channel state information reference signal(s).

The node 10 also includes a communication circuitry 130. The communication circuitry 130 may include functions for wired and/or wireless communication with other devices and/or network nodes in the network. In a particular example, the communication circuitry 130 may be based on radio circuitry for communication with one or more other nodes, including transmitting and/or receiving information. The communication circuitry 130 may be interconnected to the processor 110 and/or memory 120. By way of example, the communication circuitry 130 may include any of the following: a receiver, a transmitter, a transceiver, input/output (I/O) circuitry, input port(s) and/or output port(s). The communication circuitry is preferably configured to transmit the dedicated reference signal, and to transmit the common CSI reference signal(s). Preferably, the communication circuitry 130 is configured to receive information associated with sets of CSI obtained from the second node.

In one embodiment, the communication circuitry 130 is configured to transmit the transmission signal(s) and to receive, from the second node, information associated with the base set of CSI. In one embodiment, the communication circuitry 130 is configured to receive, from the second node, the transmission signal(s). Preferably, the communication circuitry 130 is configured to transmit, to the second node, the configuration information enabling acquisition of the transmission signal(s), to transmit, to the second node, the configuration information enabling acquisition of a dedicated reference signal, and to transmit, to the second node, the configuration information for enabling acquisition of the common channel state information reference signal(s).

Figure 13:
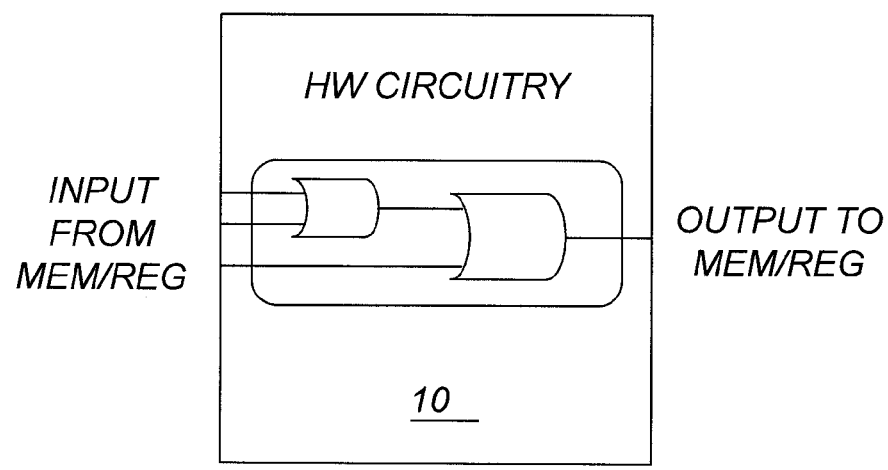
FIG. 13 is a schematic block diagram illustrating a hardware embodiment of a node for managing CSI in a wireless communication system.

FIG. 13 is a schematic block diagram illustrating another example of a node 10, based on a hardware circuitry implementation according to an embodiment. Particular examples of suitable hardware (HW) circuitry include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

Figure 14:
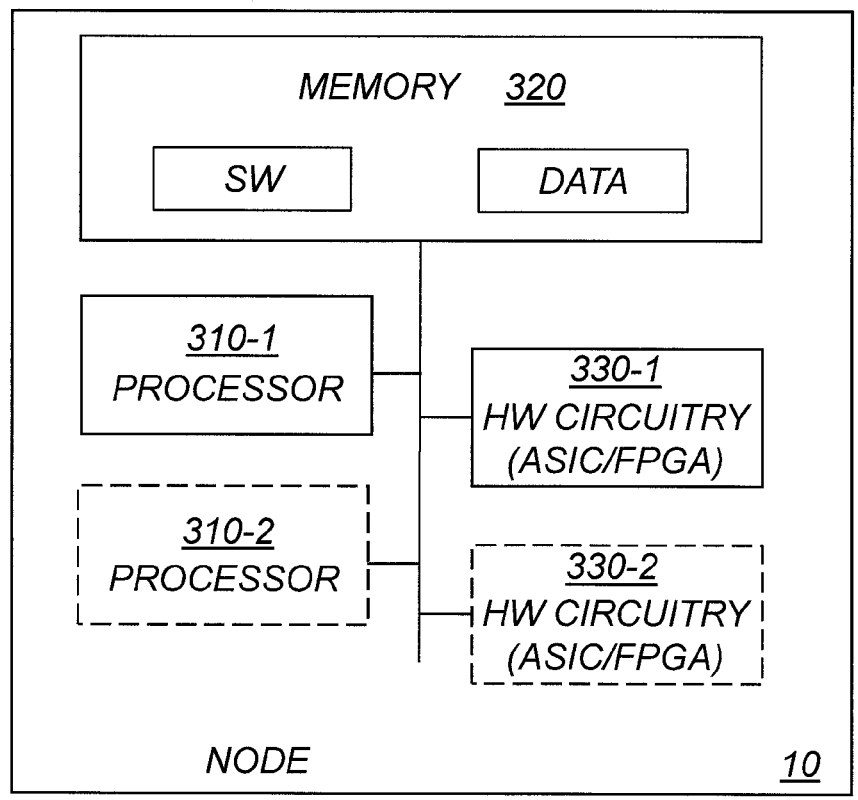
FIG. 14 is a schematic block diagram illustrating an embodiment of a node for managing CSI in a wireless communication system based on a combination of hardware and software.

FIG. 14 is a schematic block diagram illustrating yet another example of anode 10, based on combination of both processor(s) 310-1, 310-2 and hardware circuitry 330-1, 330-2 in connection with suitable memory unit(s) 320. The node 10 comprises one or more processors 310-1, 310-2, memory including storage for software and data, and one or more units of hardware circuitry 330-1, 330-2 such as ASICs and/or FPGAs. The overall functionality is thus partitioned between programmed software (SW) for execution on one or more processors 310-1, 310-2, and one or more pre-configured or possibly reconfigurable hardware circuits 330-1, 330-2 such as ASICs and/or FPGAs. The actual hardware-software partitioning can be decided by a system designer based on a number of factors including processing speed, cost of implementation and other requirements.

Alternatively, or as a complement, at least some of the steps, functions, procedures, modules and/or blocks described herein may be implemented in software such as a computer program for execution by suitable processing circuitry such as one or more processors or processing units.

The flow diagram or diagrams presented herein may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 15:
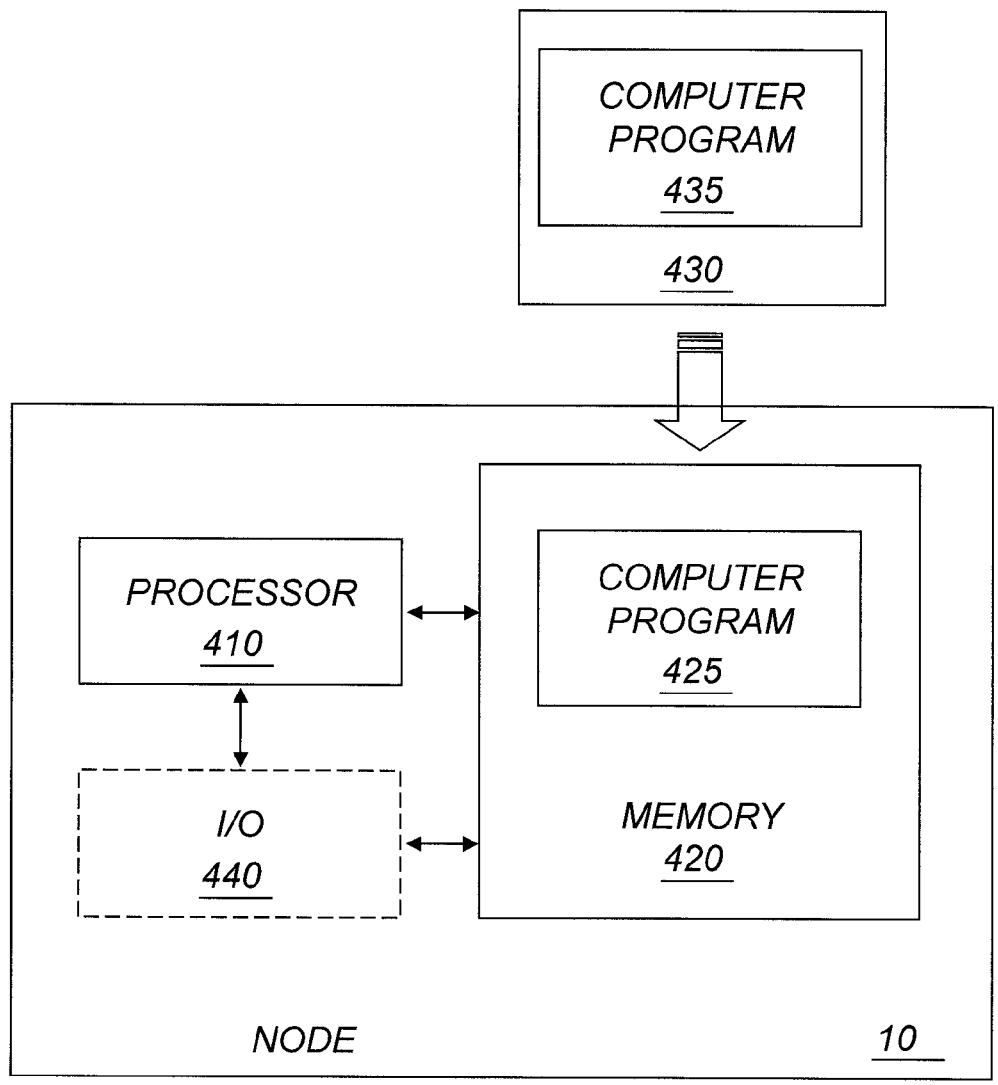
FIG. 15 is a schematic block diagram illustrating an embodiment of a node for managing CSI in a wireless communication system based on processors and software.

FIG. 15 is a schematic diagram illustrating an example of a computer-implementation according to an embodiment of a node 10. In this particular example, at least some of the steps, functions, procedures, modules and/or blocks described herein are implemented in a computer program 425; 435, which is loaded into the memory 420 for execution by processing circuitry including one or more processors 410. The processor(s) 410 and memory 420 are interconnected to each other to enable normal software execution. An optional input/output device 440 may also be interconnected to the processor(s) and/or the memory 420 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 410 is thus configured to perform, when executing the computer program 425, well-defined processing tasks such as those described herein.

The processing circuitry does not have to be dedicated to only execute the above-described steps, functions, procedure and/or blocks, but may also execute other tasks.

In a particular embodiment, the computer program comprises instructions, which when executed by at least one processor, cause the processor(s) to obtain a base set of CSI of a channel between a first node and a second node based on at least one transmission signal. The instructions, when executed by the processor(s), cause the processor(s) further to transmit, within a channel subspace selected in dependence of the obtained base set of CSI, a dedicated reference signal, specific for the second node. The instructions, when executed by the processor(s), cause the processor(s) further to transmit at least one common CSI reference signal specific for an intended coverage area of the first node. The common CSI reference signal(s) allows obtaining a fall-back set of CSI between the first node and the second node based on the common CSI reference signal(s). The fall-back set of CSI represents coarser granularity, in spatial dimensions, than the base set of CSI.

In one aspect, a carrier comprises the computer program as described above, wherein the carrier is one of an electronic signal, an optical signal, an electromagnetic signal, a magnetic signal, an electric signal, a radio signal, a microwave signal, or a computer-readable storage medium.

By way of example, the software or computer program 425; 435 may be realized as a computer program product, which is normally carried or stored on a computer-readable medium 420; 430, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

Figure 16:
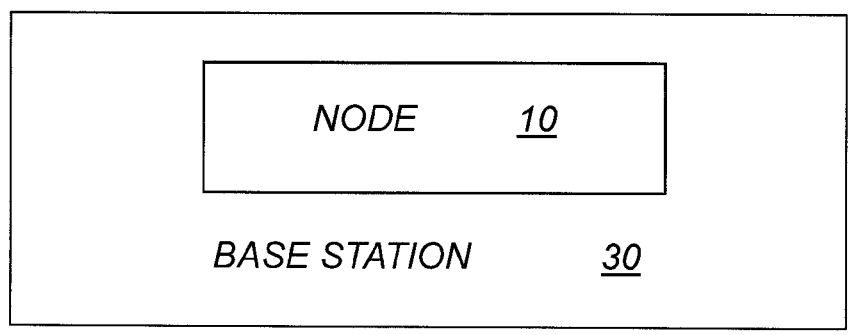
FIG. 16 is a block diagram illustrating an embodiment of a base station for managing CSI in a wireless communication system.

FIG. 16 is a schematic block diagram illustrating an example of a base station comprising or constituting a node 10 according to any of the embodiments described above.

In one embodiment, the first node is a radio base station.
In one embodiment, the second node is a wireless terminal.

The network device may be any suitable network device in the wireless communication system, or a network device in connection with the wireless communication system. By way of example, the network device may be a suitable network node such a base station or an access point. However, the network device may alternatively be a cloud-implemented network device.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 17:
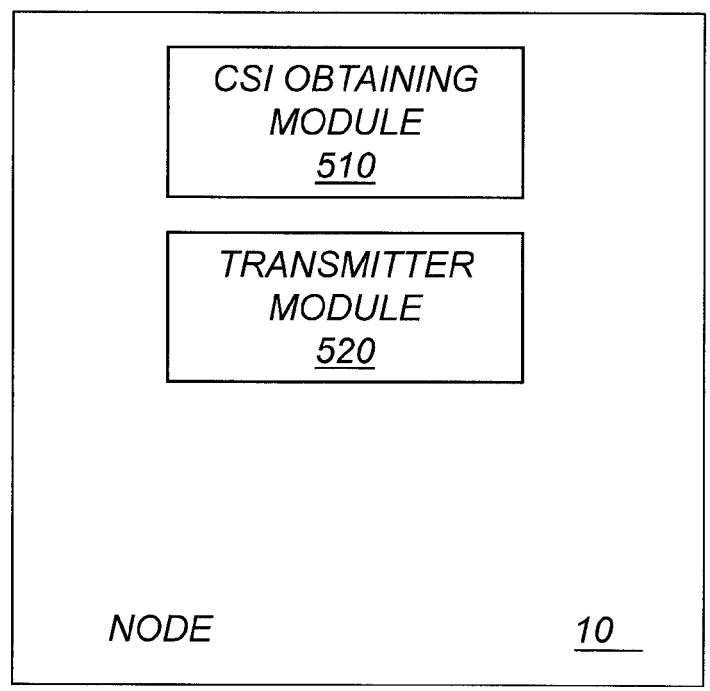
FIG. 17 is a schematic block diagram illustrating another embodiment of a node for managing CSI in a wireless communication system.

FIG. 17 is a schematic diagram illustrating an example of an apparatus or a node 10 in a wireless communication system for managing CSI. The node comprises a CSI obtaining module 510 for obtaining a base set of CSI of a channel between the node and a second node based on at least one transmission signal. The node 10 further comprises a transmitter module 520 for transmitting, within a channel subspace selected in dependence of the obtained base set of CSI, a dedicated reference signal, specific for the second node, and for transmitting at least one common CSI reference signal specific for an intended coverage area of the first node. The common CSI reference signal(s) allows obtaining a fall-back set of CSI between the first node and the second node based on the common CSI reference signal(s). The fall-back set of CSI represents coarser granularity, in spatial dimensions, than the base set of CSI.

Alternatively it is possible to realize the module(s) in FIG. 17 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

Abbreviations

3GPP 3rd Generation Partnership Project
5G/NR 5$^{th}$ Generation new radio
ASIC Application Specific Integrated Circuits
BST base station
BTS Base Transceiver Stations
CD Compact Disc
COTS Common Off-The-Shelf
CPE Customer Premises Equipment
CPU Central Processing Units
CRI CSI-RS Resource Indicator
CRS Cell-specific Reference Signal
CSI Channel State Information
CSI-RS CSI Reference Symbol
CQI channel quality indicator
DFT Discrete Fourier Transform
DSP Digital Signal Processors
DVD Digital Versatile Disc
eNB evolved Node B
FPGA Field Programmable Gate Arrays
GSM Global System for Mobile communications
HDD Hard Disk Drive
HW hardware
IFFT Inverse Fast Fourier Transforms
I/O input/output
LEE Laptop Embedded Equipment
LME Laptop Mounted Equipment
LTE The Long-Term Evolution
MEM memory units
MIMO multiple-input multiple-output
ND Network Device
NZP Non-Zero Power
OFDM Orthogonal Frequency-Division Multiplexing
OS Operating System
OSS Operations and Support System
PC Personal Computer
PDA Personal Digital Assistant
PLC Programmable Logic Controllers
PMI precoder matrix indicator
RAM Random Access Memory
REG registers
RI rank indicator
ROM Read-Only Memory
RRU Remote Radio Units
STA Station
SW software
TFRE time/frequency resource element
UE User Equipment
USB Universal Serial Bus
WCDMA Wideband Code Division Multiple Access

The invention claimed is:

1. A method for managing channel state information in a wireless communication system, said method comprising:
   obtaining, in a first node, a base set of channel state information of a channel between said first node and a second node based on at least one transmission signal;
   transmitting, from said first node, within a channel subspace selected in dependence of said obtained base set of channel state information, a dedicated reference signal, specific for a limited set of nodes comprising said second node; and
   transmitting, from said first node, at least one common channel state information reference signal specific for an intended coverage area of said first node;
   said common channel state information reference signal allowing for obtaining a fall-back set of channel state information of a channel between said first node and said second node based on said at least one common channel state information reference signal, which fall-back set of channel state information representing coarser granularity, in spatial dimensions, than said base set of channel state information.

2. The method according to claim 1, wherein said at least one common channel state information reference signal has a lower dimensionality than said at least one transmission signal, where dimensionality is defined as a number of orthogonal channel measurements that are required in order to estimate a resulting channel at a given time frequency resource.

3. The method according to claim 2, wherein said at least one transmission signal is sent from said first node and said at least one common channel state information reference signal is transmitted utilizing a number of antenna ports that is smaller than a number of antenna ports used for transmitting said at least one transmission signal.

4. The method according to claim 2, wherein said at least one transmission signal is sent from said first node and said at least one common channel state information reference signal is transmitted from only a subset of antenna ports from which said at least one transmission signal is transmitted.

5. The method according to claim 1, further comprising:
receiving, from said second node, information associated with said fall-back set of channel state information of a channel between said first node and said second node based on said at least one common channel state information reference signal.

6. The method according to claim 5, wherein said at least one common channel state information reference signal comprises reference symbols specific for said intended coverage area of said first node.

7. The method according to claim 5, wherein said transmitting of said at least one common channel state information reference signal comprises beam sweeping within said intended coverage area of said first node.

8. The method according to claim 1, wherein said at least one common channel state information reference signal is transmitted less frequently than said dedicated reference signal.

9. The method according to claim 1, wherein said at least one common channel state information reference signal is transmitted more frequently than said at least one transmission signal.

10. The method according to claim 1, wherein said obtaining of said base set of channel state information comprises:
transmitting, from said first node, said at least one transmission signal; and
receiving, from said second node, information associated with said base set of channel state information.

11. The method according to claim 10, wherein said at least one transmission signal comprises reference symbols specific for said intended coverage area of said first node.

12. The method according to claim 1, wherein said obtaining of said base set of channel state information comprises:
receiving, from said second node, said at least one transmission signal;
determining said base set of channel state information for said channel between said first node and said second node by utilizing transmitter-receiver reciprocity.

13. The method according to claim 1, further comprising:
receiving, from said second node, information associated with a dedicated set of channel state information of a channel between said first node and said second node based on said dedicated reference signal.

14. The method according to claim 13, wherein said dedicated reference signal comprises precoded reference symbols specific for said second node.

15. A method for enabling managing of channel state information in a wireless communication system, said method comprising:

transmitting, from a first node to a second node, configuration information for said second node enabling acquisition of at least one transmission signal;
said at least one transmission signal enabling for obtaining of a base set of channel state information of a channel between said first node and said second node;
transmitting, from said first node to said second node, configuration information for said second node enabling acquisition of a dedicated reference signal, specific for a limited set of nodes comprising said second node, within a channel subspace;
transmitting, from said first node to said second node, configuration information for said second node enabling acquisition of at least one common channel state information reference signal specific for an intended coverage area of said first node;
said at least one common channel state information reference signal allowing for obtaining a fall-back set of channel state information between said first node and said second node based on said at least one common channel state information reference signal, which fall-back set of channel state information representing coarser granularity, in spatial dimensions, than said base set of channel state information.

16. A first node configured to manage channel state information in a wireless communication system, comprising:
a processor; and
a memory containing instructions which, when executed by said processor, are capable of causing the node to perform operations to:
obtain a base set of channel state information of a channel between said first node and a second node based on at least one transmission signal;
transmit, within a channel subspace selected in dependence of said obtained base set of channel state information, a dedicated reference signal, specific for a limited set of nodes comprising said second node;
transmit at least one common channel state information reference signal specific for an intended coverage area of said first node;
said at least one common channel state information reference signal allowing for obtaining a fall-back set of channel state information between said first node and said second node based on said at least one common channel state information reference signal, which fall-back set of channel state information representing coarser granularity, in spatial dimensions, than said base set of channel state information.

17. The first node according to claim 16, further comprising communication circuitry configured to transmit said dedicated reference signal, and to transmit said at least one common channel state information reference signal.

18. A non-transitory machine readable storage medium comprising instructions which, when executed by at least one processor are capable of causing the at least one processor to perform operations comprising:
obtaining a base set of channel state information of a channel between a first node and a second node based on at least one transmission signal;
transmitting within a channel subspace selected in dependence of said obtained base set of channel state information, a dedicated reference signal, specific for a limited set of nodes comprising said second node; and
transmitting at least one common channel state information reference signal specific for an intended coverage area of said first node; and said at least one common channel state information reference signal allowing for obtaining a fall-back set of channel state information between said first node and said second node based on said at least one common channel state information reference signal, which fall-back set of channel state information representing coarser granularity, in spatial dimensions, than said base set of channel state information.

* * * * *